May 27, 1958     H. E. VAN VOORHEES     2,836,050
AUTOMOBILE DOOR LATCH

Filed Nov. 16, 1953     3 Sheets-Sheet 1

INVENTOR
Harold E. Van Voorhees
BY
Paul Fitzpatrick
ATTORNEY

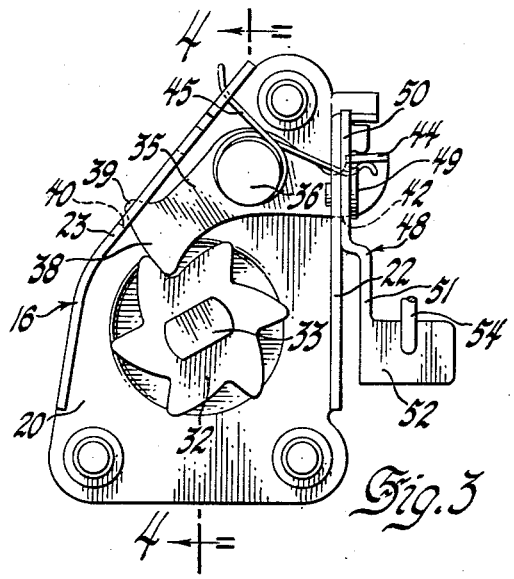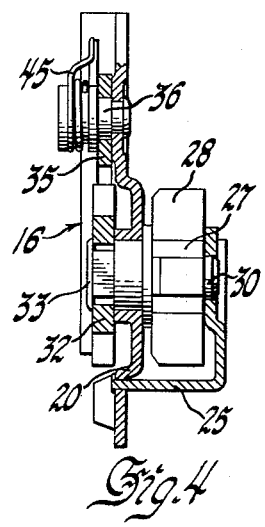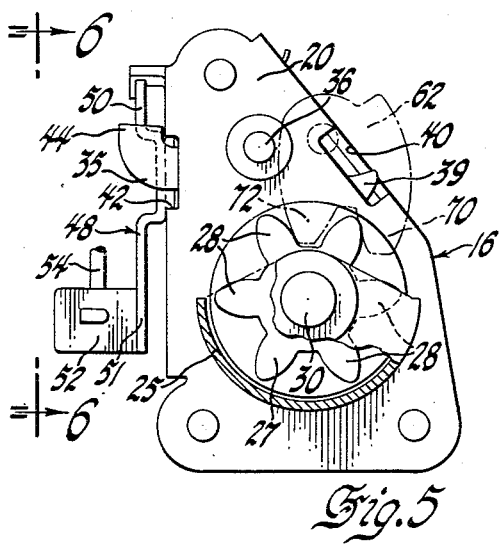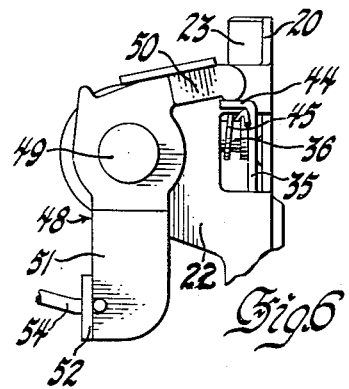

May 27, 1958   H. E. VAN VOORHEES   2,836,050
AUTOMOBILE DOOR LATCH

Filed Nov. 16, 1953   3 Sheets-Sheet 3

INVENTOR
Harold E. Van Voorhees
BY
Paul Kilpatrick
ATTORNEY

United States Patent Office

2,836,050
Patented May 27, 1958

2,836,050

AUTOMOBILE DOOR LATCH

Harold E. Van Voorhees, Grosse Pointe Woods, Mich., assignor to General Motors Corporation, Detroit, Mich., a corporation of Delaware Application November 16, 1953, Serial No. 392,268

10 Claims. (Cl. 70—149)

This invention relates to a door latch, and more particularly to an automobile door latch having a pivoted bolt carried by the door and a striker mounted on the automobile body and having a pivoted bolt holding portion.

One feature of the invention is that it provides an improved door latch; another feature of the invention is that it provides an improved door latch striker; still another feature of the invention is that the striker has a part which is pivotally mounted on the automobile body and is operable by release means on the outside of said body; a further feature of the invention is that the door may be unlatched either by means operable on the bolt from inside the car or by means operable on the striker from outside the car; still another feature of the invention is that the pivoted striker part has a latching tooth which is radial to the pivotal axis of the striker part to facilitate unlatching movement of the striker; yet another feature of the invention is that the pivoted striker part is held in latching position by a dog which may be moved out of blocking relation to the striker part by release means on the outside of the body; and still a further feature of the invention is that the dog is connected to a crank which may be rotated by an outside push button mounted substantially flush with the body.

Other features and advantages of the invention will be apparent from the following description and from the drawings, in which:

Fig. 3 is an elevation of the latch removed from the automobile looking in the direction of the line 3—3 of Fig. 2;

Fig. 4 is a section through the latch taken along the line 4—4 of Fig. 3;

Fig. 5 is a vertical section through the latch taken along the line 5—5 of Fig. 1;

Fig. 6 is a view looking from the left of Fig. 5 along the line 6—6 thereof;

Figure 1:
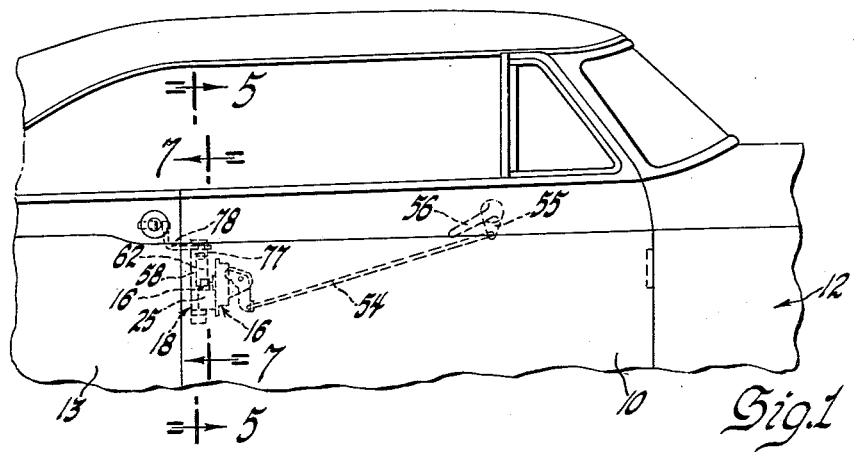
Fig. 1 is a fragmentary side elevational view of an automobile having the improved door latch mounted thereon.
Figure 2:
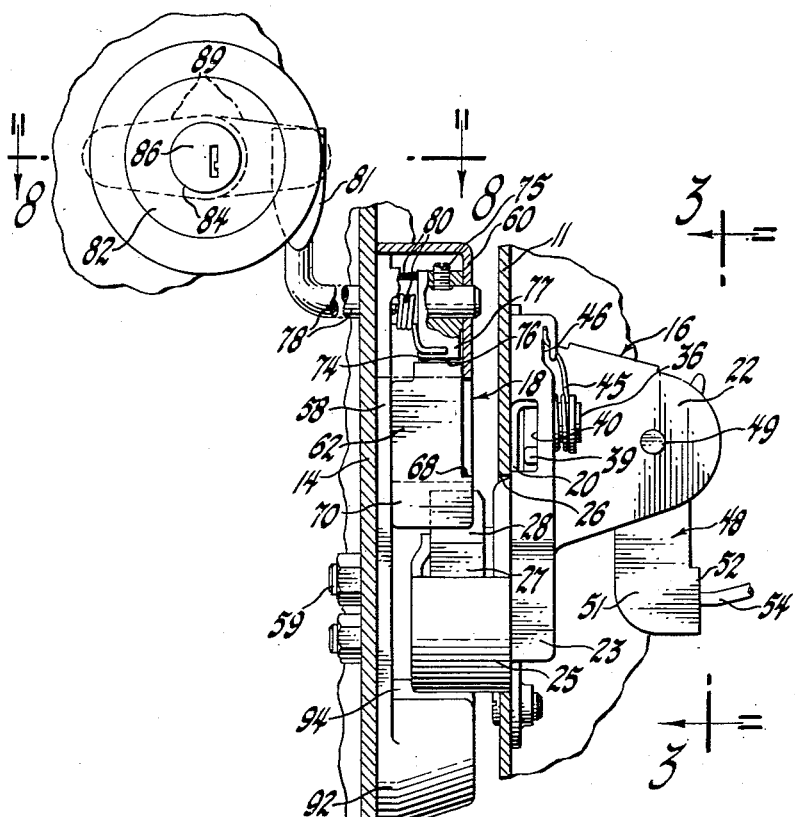
Fig. 2 is a section through the door and the body immediately inwardly of the outer door panel and outer body panel, with the door in latched position, portions of the latch release mechanism being broken away.

Referring now more particularly to the drawings, Fig. 1 shows an automobile having a door 10 which is hingedly mounted at its front edge on the automobile body 12 and which has, at its rear edge, a pillar 11 with a jamb face (Fig. 2) joining the inner and outer panels of the door. The automobile body 12 has a rear quarter panel 13 which terminates at the front in a body pillar 14 (Fig. 2) having a jamb face adjacent the jamb face of the door pillar 11.

A door latch designated generally as 16 is mounted on the jamb face of the door pillar 11 and a striker designated generally as 18 is mounted on the jamb face of the body pillar 14.

The latch 16 comprises a main plate 20 which lies against the inside surface of the jamb face of the door pillar 11, and a right angular flange 22 which extends forwardly of the car at the inner edge of the plate 20. A shallow right angular flange 23 projects from the outer edge of plate 20.

A generally semi-circular bolt housing 25 is mounted on the outer surface of plate 20 and projects outwardly of the jamb face of the door through an opening 26 (Fig. 2) in the pillar 11, and a gear type bolt 27 having a plurality of radial teeth 28 is rotatably mounted in the housing 25 on a stud 30 which is journaled in coaxial openings in the housing 25 and plate 20. On the inside of plate 20 a cam 32 is mounted on the stud 30, the end of said stud being staked over the cam, as shown at 33 in Figs. 3 and 4. Both the bolt 27 and the cam 32 are fixed nonrotatably on stud 30, and the stud is journaled for free rotation in the housing 25.

A detent 35 is pivotally mounted intermediate its ends on a rivet 36 which projects from the inner surface of the plate 20. At one end, detent 35 has a foot 38 for engaging the cam to hold the bolt against rotation in a door opening direction (a counterclockwise direction as the parts appear in Fig. 7 and a clockwise direction as the parts appear in Fig. 3). The detent foot 38 has a toe portion 39 which projects through a slot 40 in the shallow flange 23, the walls of the slot 40 providing guide means for the detent to prevent it from becoming bent away from the cam 32. The other end of the detent projects through a slot 42 to the inside surface of flange 22 and terminates in a bent ear 44. A spring 45 is coiled around rivet 36 and has one end anchored in a slot 46 (Fig. 2) in the shallow outer flange 23 and the other end in abutment with the ear 44 on detent 35 (Fig. 3) so that the spring 45 constantly urges the detent into engagement with the cam teeth. A remote lever 48 is pivoted on the flange 22 by a rivet 49, this lever being in the form of a bell crank having one arm 50 overlying detent ear 44 and the other arm 51 terminating in an ear 52 to which is connected a remote operating rod 54. This rod extends forwardly of the door and is connected to a lever 55 (see Fig. 1) on the inner door panel. A pivotally mounted inside remote handle 56 on the inside of the door is connected to the lever 55 so that upon turning handle 56, lever 55 is pivoted in a counterclockwise direction (Fig. 1), pulling rod 54 forwardly and pivoting remote lever 48 and detent 35 against the force of spring 45. When the foot 38 of the detent moves out of engagement with the cam 32, the bolt 27 and cam 32 are freely rotatable and the door may be opened, the pressure of the conventional resilient weatherseal aiding this opening movement. When the door is opened from inside the car, the bolt pivots and the striker remains stationary. When the door is slammed shut, the bolt also pivots, detent 35 acting as a pawl on cam 32 to permit pivotal movement of the cam and bolt in a door closing direction, and the bolt teeth ride over and mesh with the striker teeth.

The striker apparatus comprises a striker plate 58 which is mounted on the jamb face of the body pillar 14 by means of screws 59. The striker plate is formed with an upper housing 60 within which is pivotally mounted a toothed striker part or member 62, a stud 64 providing a pivotal axis for this member and a spring 65 on the stud constantly urging the pivoted striker part 62 in a door latching direction, which is a counterclockwise direction, as the parts appear in Fig. 7.

The lower portion of the striker housing 60 terminates in a curved edge 67, and the striker member 62 is provided with a widened portion 68 (see Figs. 2 and 7) below this curved edge so that the striker teeth 70 and 72 extend out to the plane of the outside surface of the striker housing, thus increasing the area of overlap between the striker teeth and the bolt teeth. Striker tooth 70 is the safety tooth and the tooth 72 is the main latching tooth. It should be noted that the main latching tooth 72 projects radially to the pivotal axis 64 of the striker member 62 so that no interference is present when the striker member 62 pivots as the door is opened from outside the car, the radial positioning of this tooth insuring that the tooth moves away from the bolt when the striker starts its pivotal movement.

The upper portion of the pivoted striker member is formed with a shoulder 74 which is adapted to abut the end 76 of a pivoted dog 77. A pivotal mounting for the dog is provided by a rod 78 which is journaled in the striker plate 58 and the upper housing 60, the dog 77 being nonrotatably mounted on the rod 78 by means of a set screw 75 and a spring 80 being provided to urge the dog into engagement with the shoulder 74 on the striker member. The rod 78 extends rearwardly of the automobile and terminates in an upwardly turned crank portion 81.

In order to release the striker part 62 for pivotal movement, a push button 82 is mounted on the outer surface of the body panel 13, the push button preferably being substantially flush with said panel. The push button assembly carries a conventional key-operated lock cylinder 84 which is coupled to a spring biased push rod 86, the spring 88 urging the push rod 86, lock cylinder 84 and push button 82 outwardly. The push rod 86 is rotatable with the lock cylinder 84, and on its inner end, carries a crank link 89 which, at its free end, has an abutment screw 90. When the door is unlocked, the screw 90 lies adjacent the crank 81, as shown in broken lines in Fig. 8, so that operation of the push button will pivot the crank rod 78 and move dog 77 out of blocking engagement with the striker member 62. When this occurs, the pressure of the conventional resilient door weatherseal kicks the door open, the striker part 62 pivoting to permit disengagement of the bolt teeth therefrom. Generally, the door seal pressure is in the neighborhood of 80 pounds or more, and a resilient rubber weatherseal extends entirely around the periphery of the door and is compressed or deflected to provide a watertight seal between the door and the body. When the striker member 62 is released for free pivotal movement, this seal pressure opens the door beyond the safety position, the striker part pivoting as the door opens. Because the latching tooth 72 is radial, there is no wedging action between the striker and the bolt 27 as the striker part pivots. Since the push button 82 is mounted in the body panel and not in the door, the operator is not pushing against this seal pressure when the door is opened from the outside, and, therefore, an outer door handle is not necessary with this improved latch.

Figure 8:
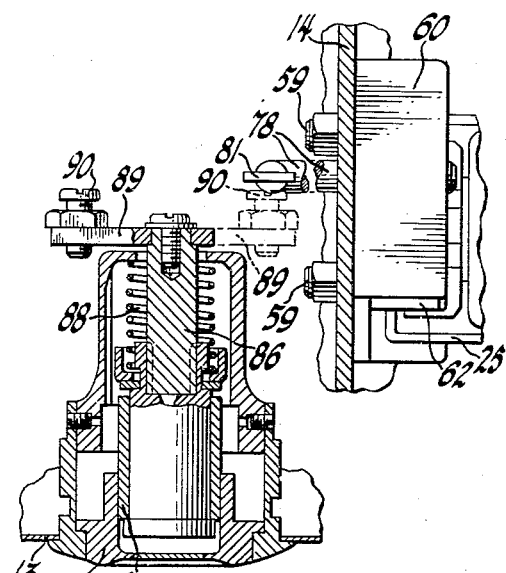
Fig. 8 is a horizontal section taken along the line 8—8 of Fig. 2.

In order to lock the door, a key (not shown) is inserted in the lock cylinder and the lock cylinder is rotated to move the abutment screw 90 away from the crank 81. This rotation may be through an arc of 180 degrees, as illustrated in Fig. 8, or through a smaller arc so long as the path of inward movement of the push button parts is away from the crank 81 when the door is locked. The screw 90 may be turned in or out to provide desired push button operation, either with some play in the push button or with little or no play in the push button, as desired.

Figure 7:
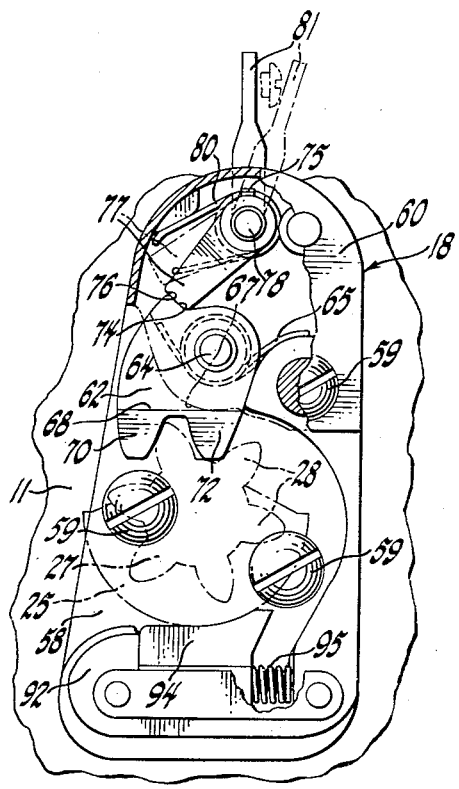
Fig. 7 is a vertical section through the latch and striker taken along the line 7—7 of Fig. 1.

Adjacent the bottom of the striker plate 58 is a lower housing 92 in which is mounted a conventional type of spring biased sliding shoe 94. This shoe is urged outwardly by a spring 95, and the shoe is engaged by the lower surface of the bolt housing 25 to provide a dovetail or wedging action, as shown in Fig. 7, and hold the bolt teeth in engagement with the striker teeth despite any looseness or sag in the door.

While I have shown and described one embodiment of my invention, it is capable of many modifications. Changes, therefore, in the construction and arrangement may be made without departing from the spirit and scope of the invention as set forth in the appended claims.

I claim:

1. An automobile door latch of the character described, including: a latch mounted on the door, said latch including a toothed bolt; means for holding the bolt against movement in one direction; a striker housing mounted on the automobile body, said housing having a terminal edge; a striker part pivotally mounted in said housing and engageable with said bolt for holding said door latched, said striker part having a widened portion adjacent said edge extending to the plane of the outside surface of said housing; a dog for holding said striker part in door latching position; a crank connected to said dog; latch release means on the outside of said body adapted to engage said crank for moving said dog to release the striker part and unlatch the door; and means for moving said release means out of position to engage said crank.

2. Apparatus of the character claimed in claim 1, wherein said latch release means comprises a push button substantially flush with said body.

3. A door latch striker of the character described, including: a striker housing mounted on the automobile body, said housing having a curved lower edge; a striker member pivotally mounted on said housing at the axis of said arcuate edge, said striker member having a widened portion adjacent said edge extending to the plane of the outside surface of said housing and having a latching tooth which is radial to the pivotal axis of said member and a safety tooth; a dog for holding said striker member in door latching position; a rockable crank connected to said dog; and release means on the outside of said body adapted to rock the crank arm for moving said dog to release the striker member and unlatch the door.

4. Apparatus of the character described for latching a door to a body, including: a latch mounted on the door, said latch including a pivoted bolt and a pivoted detent member for holding the bolt in door latching position; a striker pivotally mounted on the body and engageable with said bolt for holding said door latched; releasable means for holding said striker against movement; first operating means on the door including a member engageable with said detent and operable to pivot said detent to release the bolt to unlatch the door; and second operating means on the body operable on said releasable means to free the striker and unlatch the door.

5. Apparatus of the character described for latching a door to a body, including: a latch mounted on the door, said latch including a pivoted bolt and a pivoted detent member for holding the bolt in door latching position; a striker pivotally mounted on the body and engageable with said bolt for holding said door latch; a pivoted dog for holding said striker in door latching position; first operating means on the door including a member engageable with said detent and operable to pivot said detent to release the bolt to unlatch the door; and second operating means on the body engageable with said dog and operable to pivot the dog to free the striker and unlatch the door.

6. Apparatus of the character described for latching a door to a body, including: a latch mounted on the door, said latch including a pivoted toothed bolt and a pivoted detent member for holding the bolt in door latching position; a striker pivotally mounted on the body and having teeth engageable with said bolt teeth for holding said door latch; a pivoted dog for holding said striker in door latching position; first operating means on the inside of said door including a member engageable with said detent and operable to pivot said detent to release the bolt to unlatch the door; and second operating means on the outside of said body including a member engageable with said dog and operable to pivot said dog to free the striker and unlatch the door.

7. Apparatus of the character claimed in claim 6, wherein the striker has a latching tooth which is radial to the pivotal axis of the striker.

8. Apparatus of the character claimed in claim 6, wherein the bolt teeth project radially to the pivotal axis of the bolt and the striker has a latching tooth which is radial to the pivotal axis of the striker.

9. Apparatus of the character described for latching a door to a body, including: a latch mounted on the door, said latch including a pivoted bolt and detent means for holding the bolt in door latching position; a striker pivotally mounted on the body and engageable with said bolt for holding said door latched; releasable means for holding said striker against movement; first operating means on the door adapted to engage said detent means and move the detent means out of holding relation to the bolt for releasing the bolt to unlatch the door; second operating means on the body operable on said releasable means to free the striker and unlatch the door; and means for moving said first operating means out of position to engage said detent means.

10. An automobile door latch of the character described, including: a latch mounted on the door, said latch including a pivoted bolt having a plurality of radially extending teeth and a pivoted detent member for holding the bolt in door latching position; a striker pivotally mounted on the automobile body and having a latching tooth which is radial to the pivotal axis of the striker and a safety tooth, said striker teeth being engageable with said bolt teeth for holding said door latch; a pivoted dog for holding the striker in door latching position; first operating means on the inside of said door including a member engageable with said detent and operable to pivot said detent to release the bolt to unlatch the door; and second operating means on the outside of said body including a member engageable with said dog and operable to pivot said dog to release the striker and unlatch the door.

References Cited in the file of this patent

UNITED STATES PATENTS

| 729,980 | Vordemfelde | June 2, 1903 |
| 1,243,433 | Lurie | Oct. 16, 1917 |
| 1,302,896 | Burgess | May 6, 1919 |
| 2,156,874 | Schonitzer | May 2, 1939 |
| 2,218,183 | Springer | Oct. 15, 1940 |
| 2,322,892 | Springer | June 29, 1943 |
| 2,340,470 | Haseltine | Feb. 1, 1944 |
| 2,647,003 | Way | July 28, 1953 |
| 2,673,757 | Marple | May 30, 1954 |
| 2,719,049 | Fish | Sept. 27, 1955 |

FOREIGN PATENTS

| 14,377 | Great Britain | 1888 |